United States Patent
Matsumoto

(10) Patent No.: US 9,227,871 B2
(45) Date of Patent: *Jan. 5, 2016

(54) GLASS WELDING METHOD AND GLASS LAYER FIXING METHOD

(75) Inventor: Satoshi Matsumoto, Hamamatsu (JP)

(73) Assignee: HAMAMATSU PHOTONICS K.K., Hamamatsu-shi, Shizuoka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/511,721

(22) PCT Filed: Sep. 17, 2010

(86) PCT No.: PCT/JP2010/066141
§ 371 (c)(1),
(2), (4) Date: Jun. 13, 2012

(87) PCT Pub. No.: WO2011/065108
PCT Pub. Date: Jun. 3, 2011

(65) Prior Publication Data
US 2012/0240630 A1     Sep. 27, 2012

(30) Foreign Application Priority Data
Nov. 25, 2009  (JP) ................ P2009-267814

(51) Int. Cl.
*C03C 8/24* (2006.01)
*B23K 26/18* (2006.01)
(Continued)

(52) U.S. Cl.
CPC ............ *C03C 27/06* (2013.01); *C03B 23/245* (2013.01)

(58) Field of Classification Search
CPC ........ B32B 17/00; B32B 17/06; C03C 27/10; C03C 27/00

USPC .......................... 65/43, 36; 156/99
See application file for complete search history.

(56) References Cited

U.S. PATENT DOCUMENTS 3,453,097 A   7/1969  Hafner
3,663,793 A   5/1972  Petro et al.
(Continued)

FOREIGN PATENT DOCUMENTS

CN    1329395    1/2002
CN    1738777    2/2006
(Continued)

OTHER PUBLICATIONS

Hideaki Yasui et al. JP 20021220, Methodfor Manufacturing Image display device, manufacturing apparatus and image display device manufactured by using the same translated by: United States patent and trademark office Mcelroy translation company Jun. 2012.*

(Continued)

*Primary Examiner* — Jodi C Franklin
(74) *Attorney, Agent, or Firm* — Drinker Biddle & Reath LLP

(57) ABSTRACT

A glass layer 3 is irradiated with laser light L1 for temporary firing, so that a main portion 32 of the glass layer 3 excluding a one portion 31 thereof and extending like a ring open at the one portion 31 is molten and fixed to a glass member 4. As a consequence, the one portion 31 of the glass layer 3 in which the glass frit 2 is not molten exists between one end 32a and the other end 32b of the glass layer 3 fixed to the glass member 4. Superposing a glass member 5 on the glass member 4 with the glass layer 3 interposed therebetween in this state and irradiating the one portion 31 and main portion 32 of the glass layer 3 with second laser light L2, so as to fuse the glass members 4, 5 to each other, can prevent leaks from occurring in the glass layer 3, thereby making it possible to manufacture a glass fusing structure 1 which requires hermetic fusing.

9 Claims, 14 Drawing Sheets

(51) Int. Cl.
*C03C 27/06* (2006.01)
*C03B 23/24* (2006.01)

(56) References Cited

U.S. PATENT DOCUMENTS

| | | |
|---|---|---|
| 4,343,833 A | 8/1982 | Sawae et al. |
| 5,489,321 A | 2/1996 | Tracy et al. |
| 6,565,400 B1 | 5/2003 | Lee et al. |
| 7,371,143 B2 | 5/2008 | Becken et al. |
| 7,641,976 B2 | 1/2010 | Lamberson et al. |
| 7,820,941 B2 | 10/2010 | Brown et al. |
| 7,834,550 B2 | 11/2010 | Lee et al. |
| 7,932,670 B2 | 4/2011 | Yoo et al. |
| 8,063,561 B2 | 11/2011 | Choi et al. |
| 8,440,479 B2 | 5/2013 | Nguyen et al. |
| 8,490,434 B2 | 7/2013 | Watanabe et al. |
| 8,516,852 B2 | 8/2013 | Matsumoto et al. |
| 2004/0069017 A1 | 4/2004 | Li et al. |
| 2004/0207314 A1 | 10/2004 | Aitken et al. |
| 2005/0103755 A1 | 5/2005 | Baker et al. |
| 2006/0082298 A1 | 4/2006 | Becken et al. |
| 2006/0084348 A1 | 4/2006 | Becken et al. |
| 2007/0007894 A1 | 1/2007 | Aitken et al. |
| 2007/0053088 A1 | 3/2007 | Kranz et al. |
| 2007/0128967 A1 | 6/2007 | Becken et al. |
| 2007/0170845 A1 | 7/2007 | Choi et al. |
| 2007/0173167 A1 | 7/2007 | Choi |
| 2008/0106194 A1* | 5/2008 | Logunov et al. ............... 313/512 |
| 2008/0124558 A1 | 5/2008 | Boek et al. |
| 2008/0135175 A1 | 6/2008 | Higuchi |
| 2008/0182062 A1 | 7/2008 | Becken et al. |
| 2009/0071588 A1 | 3/2009 | Kimura et al. |
| 2009/0080055 A1 | 3/2009 | Baur et al. |
| 2009/0086325 A1 | 4/2009 | Liu et al. |
| 2009/0110882 A1 | 4/2009 | Higuchi |
| 2009/0142984 A1 | 6/2009 | Logunov et al. |
| 2009/0297861 A1 | 12/2009 | Banks et al. |
| 2009/0297862 A1* | 12/2009 | Boek et al. ............... 428/428 |
| 2009/0308105 A1 | 12/2009 | Pastel et al. |
| 2010/0006228 A1 | 1/2010 | Abe et al. |
| 2010/0095705 A1 | 4/2010 | Burkhalter et al. |
| 2010/0116119 A1 | 5/2010 | Bayne |
| 2010/0129666 A1 | 5/2010 | Logunov et al. |
| 2010/0154476 A1 | 6/2010 | Becken et al. |
| 2010/0267307 A1 | 10/2010 | Park et al. |
| 2010/0304513 A1 | 12/2010 | Nguyen et al. |
| 2011/0001424 A1* | 1/2011 | Logunov et al. ............... 313/512 |
| 2011/0061789 A1* | 3/2011 | Matsumoto ............... 156/99 |
| 2011/0067448 A1 | 3/2011 | Matsumoto et al. |
| 2011/0072855 A1 | 3/2011 | Matsumoto et al. |
| 2011/0088430 A1 | 4/2011 | Matsumoto |
| 2011/0088431 A1 | 4/2011 | Matsumoto |
| 2011/0135857 A1 | 6/2011 | Logunov et al. |
| 2011/0169108 A1 | 7/2011 | Gardner et al. |
| 2011/0223360 A1 | 9/2011 | Shibuya et al. |
| 2011/0223371 A1 | 9/2011 | Kawanami |
| 2011/0256407 A1* | 10/2011 | Boek et al. ............... 428/428 |
| 2011/0265518 A1 | 11/2011 | Matsumoto et al. |
| 2012/0111059 A1 | 5/2012 | Watanabe et al. |
| 2012/0147538 A1 | 6/2012 | Kawanami et al. |
| 2012/0151965 A1 | 6/2012 | Matsumoto et al. |
| 2012/0156406 A1 | 6/2012 | Banks et al. |
| 2012/0222450 A1 | 9/2012 | Lamberson et al. |
| 2012/0234048 A1* | 9/2012 | Matsumoto ............... 65/56 |
| 2012/0240628 A1* | 9/2012 | Matsumoto ............... 65/43 |
| 2012/0240629 A1* | 9/2012 | Matsumoto ............... 65/43 |
| 2012/0240630 A1* | 9/2012 | Matsumoto ............... 65/43 |
| 2012/0240631 A1* | 9/2012 | Matsumoto ............... 65/43 |
| 2012/0240632 A1* | 9/2012 | Matsumoto ............... 65/43 |
| 2012/0240633 A1* | 9/2012 | Matsumoto ............... 65/43 |
| 2012/0247153 A1* | 10/2012 | Matsumoto ............... 65/43 |
| 2012/0260694 A1* | 10/2012 | Matsumoto ............... 65/43 |
| 2012/0285200 A1 | 11/2012 | Tanaka |
| 2012/0287026 A1 | 11/2012 | Masuda |
| 2012/0318023 A1 | 12/2012 | Shimomura |
| 2012/0320444 A1 | 12/2012 | Baur et al. |
| 2013/0011598 A1 | 1/2013 | Kawanami et al. |
| 2013/0104980 A1 | 5/2013 | Sridharan et al. |
| 2013/0111953 A1 | 5/2013 | Maloney et al. |
| 2013/0134396 A1 | 5/2013 | Shimomura et al. |
| 2013/0174608 A1 | 7/2013 | Takeuchi et al. |
| 2013/0237115 A1 | 9/2013 | Choi et al. |
| 2013/0280981 A1 | 10/2013 | Lee |
| 2013/0314760 A1 | 11/2013 | Baur et al. |

FOREIGN PATENT DOCUMENTS

| | | |
|---|---|---|
| CN | 1798708 | 7/2006 |
| CN | 1798710 | 7/2006 |
| CN | 1836177 | 9/2006 |
| CN | 101005915 | 7/2007 |
| CN | 101095247 | 12/2007 |
| CN | 101103429 | 1/2008 |
| CN | 101139165 | 3/2008 |
| CN | 100409392 C | 8/2008 |
| CN | 101312234 | 11/2008 |
| CN | 101386477 | 3/2009 |
| CN | 101434453 | 5/2009 |
| CN | 101501808 | 8/2009 |
| CN | 102056858 | 5/2011 |
| JP | 2-120259 | 5/1990 |
| JP | 5-166462 | 7/1993 |
| JP | 2000-313630 | 11/2000 |
| JP | 2002-015108 | 1/2002 |
| JP | 2002-224871 | 8/2002 |
| JP | 2002-287107 | 10/2002 |
| JP | 2002-366050 | 12/2002 |
| JP | 2002-367514 | 12/2002 |
| JP | 2004-182567 | 7/2004 |
| JP | 2005-007665 | 1/2005 |
| JP | 2005-213125 | 8/2005 |
| JP | 2006-151774 | 6/2006 |
| JP | 2006-524419 | 10/2006 |
| JP | 2007-90405 | 4/2007 |
| JP | 2007-264135 | 10/2007 |
| JP | 2008-115057 | 5/2008 |
| JP | 2008-115067 | 5/2008 |
| JP | 2008-127223 | 6/2008 |
| JP | 2008-527655 | 7/2008 |
| JP | 2009-123421 | 6/2009 |
| JP | 2009-196862 | 9/2009 |
| KR | 10-0350323 | 3/2002 |
| KR | 10-2007-00003681 | 1/2007 |
| KR | 10-2007-0088715 | 8/2007 |
| TW | 1495409 | 7/2002 |
| TW | 200516064 | 5/2005 |
| TW | 1255934 | 6/2006 |
| TW | 200733787 | 9/2007 |
| TW | 200737370 | 10/2007 |
| TW | 200822789 | 5/2008 |
| TW | 200911438 | 3/2009 |
| TW | 200944908 | 11/2009 |
| WO | WO 2007/067533 | 6/2007 |
| WO | WO 2009/131144 | 10/2009 |
| WO | WO 2009/150975 | 12/2009 |
| WO | WO 2009/150976 | 12/2009 |
| WO | WO 2009/157281 | 12/2009 |
| WO | WO 2009/157282 | 12/2009 |

OTHER PUBLICATIONS

U.S. Office Action dated Jun. 6, 2012 that issued in U.S. Appl. No. 13/345,199 including Double Patenting Rejections on pp. 5-8.

U.S. Office Action dated Jun. 28, 2012 that issued in U.S. Appl. No. 12/994,320 including Double Patenting Rejections on pp. 7-9.

U.S. Office Action dated Jul. 9, 2012 that issued in U.S. Appl. No. 12/994,321 including Double Patenting Rejections on pp. 7-9.

Cheung, Kerry, "Die-Level Glass Frit Vacuum Packaging for a Micro-Fuel Processor System," Massachusetts Institute of Technology, Jun. 2005, pp. 17-19.

U.S. Office Action dated Jan. 22, 2013 that issued in U.S. Appl. No. 13/345,199 including Double Patenting Rejections on pp. 6-8.

(56) References Cited

OTHER PUBLICATIONS

JP 20022366050 (Human Translation), retrieved from USPTO Translation Services and attached to the U.S. Office Action dated Apr. 25, 2013 in U.S. Appl. No. 12/994,539.

JP 2008115057 (Human Translation), retrieved from USPTO Translation Services and attached to the U.S. Office Action dated Apr. 25, 2013 in U.S. Appl. No. 12/994,539.

U.S. Office Action dated Apr. 25, 2013 that issued in U.S. Appl. No. 12/994,539 including Double Patenting Rejections on pp. 5-8.

JP 20022366050 (Machine Translation), as attached to Office Action dated Jun. 1, 2012 in U.S. Appl. No. 12/994,354.

JP 2008115057 (Machine Translation), as attached to Office Action dated Jun. 1, 2012 in U.S. Appl. No. 12/994,354.

U.S. Office Action dated May 9, 2013 that issued in U.S. Appl. No. 12/994,399 including Double Patenting Rejections on pp. 6-10.

U.S. Office Action dated Jan. 16, 2014 that issued in U.S. Appl. No. 13/511,735 including Double Patenting Rejections on pp. 4-8.

U.S. Office Action dated Jan. 28, 2014 that issued in U.S. Appl. No. 13/511,688 including Double Patenting Rejections on pp. 4-8.

U.S. Office Action dated Jun. 3, 2014 that issued in U.S. Appl. No. 13/511,683 including Double Patenting Rejections on pp. 5-11.

U.S. Office Action dated Jul. 2, 2014 that issued in U.S. Appl. No. 13/511,754 including Double Patenting Rejections on pp. 5-8.

U.S. Office Action dated Jul. 31, 2014 that issued in U.S. Appl. No. 12/994,354 including Double Patenting Rejections on pp. 7-10.

U.S. Office Action dated Jul. 1, 2014 that issued in U.S. Appl. No. 13/511,738 including Double Patenting Rejections on pp. 4-5.

U.S. Office Action dated Jan. 22, 2014 that issued in U.S. Appl. No. 13/509,112 including Double Patenting Rejections on pp. 4-5.

U.S. Office Action dated Jul. 1, 2014 that issued in U.S. Appl. No. 13/511,747 including Double Patenting Rejections on pp. 4-5.

U.S. Office Action dated Feb. 24, 2015 that issued in U.S. Appl. No. 13/345,199 including Double Patenting Rejections on pp. 4-14.

* cited by examiner

GLASS WELDING METHOD AND GLASS LAYER FIXING METHOD

TECHNICAL FIELD

The present invention relates to a glass fusing method which manufactures a glass fusing structure by fusing glass members together and a glass layer fixing method therefor.

BACKGROUND ART

Known as a conventional glass fusing method in the above-mentioned technical field is a method which burns a glass layer containing organic matters (organic solvents and binders), a laser-light-absorbing material, and a glass powder onto one glass member along a region to be fused, then superposes the other glass member on the one glass member with the glass layer interposed therebetween, and irradiates the glass layer with laser light along the region to be fused, so as to fuse the glass members to each other (see, for example, Patent Literature 1).

Meanwhile, for fixing the glass layer to a glass member, techniques for removing the organic matters from the glass layer by irradiation with laser light instead of heating in a furnace have been proposed (see, for example, Patent Literatures 2 and 3). Such techniques can prevent functional layers and the like formed on glass members from being worsened by heating and inhibit the energy consumption from being increased by the use of the furnace and the heating time from becoming longer in the furnace.

CITATION LIST

Patent Literature

Patent Literature 1: Japanese Translated International Application Laid-Open No. 2008-527655
Patent Literature 2: Japanese Patent Application Laid-Open No. 2002-366050
Patent Literature 3: Japanese Patent Application Laid-Open No. 2002-367514

SUMMARY OF INVENTION

Technical Problem

However, there has been a case where fixing a glass layer to a glass member by irradiation with laser light (so-called temporary firing) and then fusing glass members to each other with the glass layer interposed therebetween by irradiation with laser light (so-called final firing) causes a leak in the glass layer, thus failing to yield a glass fusing structure which requires hermetic fusing.

In view of such circumstances, it is an object of the present invention to provide a glass fusing method which can manufacture a glass fusing structure which requires hermetic fusing, and a glass layer fixing method therefor.

Solution to Problem

For achieving the above-mentioned object, the inventor conducted diligent studies and, as a result, has found out that the leak in the glass layer in the glass fusing structure occurs because there is a case where the glass layer arranged along the region to be fused extending like a closed ring is severed when fixed to the glass member by irradiation with the laser light. That is, as illustrated in FIG. 8, when irradiating a glass layer 3 with the laser light while relatively moving an irradiation region of the laser light along a region to be fused R with a predetermined position P in the glass layer 3 acting as start and end points in order to fix the glass layer to the glass member by melting the glass powder, the glass layer 3 is severed in the vicinity of the predetermined position P as the case may be. This seems to be because of the fact that, when the irradiation region of the laser light returns to the predetermined position P, a melt termination end part 3b of the glass layer 3 which shrinks upon melting of the glass powder is harder to connect with a melt starting end part 3a of the glass layer 3 which has already solidified.

Consequently, as illustrated in FIGS. 9 and 10, the melt termination end part 3b of the glass layer 3 rises and blocks a glass member 5, to which a glass member 4 is to be fused, from coming into uniform contact with the glass layer 3 when superposing the glass member 5 on the glass member 4 with the glass layer 3 interposed therebetween. When fusing the glass members 4, 5 to each other by irradiation with laser light in this state, uniform and hermetic fusing is very hard to achieve. In an example of sizes concerning the glass layer 3 in the state of FIGS. 8 to 10, the width and thickness of the glass layer 3 are about 1.0 mm and 10 μm, respectively, the height of the melt termination end part 3b is about 20 μm, and the cut width of the glass layer 3 (i.e., the gap between the melt starting end part 3a and melt termination end part 3b) is about 40 μm.

FIG. 11 is a picture representing a two-dimensional photograph of the melt starting end part and melt termination end part of the glass layer fixed to the glass member. As illustrated in the picture, the glass layer 3 is severed between the melt starting end part 3a and melt termination end part 3b. Here, the width of the melt starting end part 3a gradually increases from its center portion because of the following reason.

That is, in the glass layer arranged on the glass member, scattering of light exceeding the absorption characteristic of the laser-light-absorbing material occurs because of the particle property of the glass powder and the like, so as to place it into a lower laser light absorptance state (e.g., it looks whiter under visible light). When the glass layer is irradiated with laser light in such a state in order to be burned onto the glass member, the glass powder loses its particle property upon melting and so forth, so that the absorption characteristic of the laser-light-absorbing material appears remarkably, whereby the laser light absorptance of the glass layer rises drastically (e.g., it looks darker or greener under visible light). Hence, as illustrated in FIG. 12, the laser light absorptance of the glass layer drastically increases when the temperature of the glass layer exceeds its melting point Tm at the time of fixing the glass layer.

Here, as illustrated in FIG. 13, it is typical for laser light to have such a temperature distribution that the temperature is higher in a center part in its width direction (a direction substantially orthogonal to the advancing direction of the laser light). Therefore, when the laser light is advanced after being stayed at the irradiation start position for a while in order to yield a stable region in which the glass layer melts in the whole width thereof from the irradiation start position, the melting initially starting at the center part in the width direction may enhance the laser light absorptance at the center part, so as to place the center part into an excess heat input state, thereby generating cracks in the glass member or crystallizing the glass layer.

Advancing the laser light when the glass layer is not molten in the whole width at the irradiation start position for the laser light as illustrated in FIG. 14 in view of the above makes a region extending from the irradiation start position to the stable region become an unstable region in which the width of melting gradually increases from its center portion. The width of the melt starting end part 3a gradually increases from the center portion in FIG. 11 because of the foregoing.

Based on the foregoing findings, the inventor has conducted further studies and completed the present invention. That is, the glass fusing method in accordance with the present invention is a glass fusing method for manufacturing a glass fusing structure by fusing first and second glass members to each other, the method comprising the steps of arranging a glass layer containing a laser-light-absorbing material and a glass powder on the first glass member along a region to be fused extending like a closed ring; irradiating the glass layer with first laser light while relatively moving an irradiation region of the first laser light along the region to be fused, so as to melt a main portion of the glass layer extending like a ring open at a one portion of the glass layer, thereby fixing the main portion of the glass layer to the first glass member; and superposing the second glass member on the first glass member having the main portion of the glass layer fixed thereto with the glass layer interposed therebetween and irradiating the glass layer with second laser light, so as to fuse the first and second glass members to each other.

The glass layer fixing method in accordance with the present invention is a glass layer fixing method for manufacturing a glass-layer-fixed member by fixing a glass layer to a first glass member, the method comprising the steps of arranging the glass layer containing a laser-light-absorbing material and a glass powder on the first glass member along a region to be fused extending like a closed ring; and irradiating the glass layer with first laser light while relatively moving an irradiation region of the first laser light along the region to be fused, so as to melt a main portion of the glass layer extending like a ring open at a one portion of the glass layer, thereby fixing the main portion of the glass layer to the first glass member.

In the glass fusing method and glass layer fixing method, a main portion of the glass layer excluding a one portion thereof and extending like a ring open at the one portion is irradiated with the first laser light, so as to be molten and fixed to the first glass member. As a consequence, the one portion of the glass layer in which the glass powder is not molten exists between one and the other ends of the glass layer fixed to the first glass member. Superposing the second glass member on the first glass member with the glass layer interposed therebetween in this state and irradiating the one portion and main portion of the glass layer with second laser light, so as to fuse the first and second glass members to each other, can prevent leaks from occurring in the glass layer, thereby making it possible to manufacture a glass fusing structure which requires hermetic fusing.

Preferably, in the glass fusing method in accordance with the present invention, the region to be fused has a linear part, while one and the other ends of the main portion of the glass layer oppose each other in the linear part through the one portion of the glass layer. This allows the one portion of the glass layer to exist accurately by a predetermined width between one and the other ends of the main portion of the glass layer.

Preferably, when the glass layer containing a binder in addition to the laser-light-absorbing material and glass powder is arranged on the first glass member in the glass fusing method in accordance with the present invention, the glass layer is irradiated with the first laser light such as to gasify the binder and melt the glass powder in the main portion of the glass layer and gasify the binder without melting the glass powder in the one portion of the glass layer. This can reliably prevent bubbles from being formed in the one portion of the glass layer by gasification of the binder and leaks from being generated in the one portion by a number of bubbles connecting with each other when fusing the first and second glass members to each other by irradiation with the second laser light.

Preferably, in this case, the glass layer is irradiated with the first laser light such that the first laser light has an irradiation power lower in the one portion of the glass layer than in the main portion of the glass layer. It is also preferred for the glass layer to be irradiated with the first laser light such that the first laser light has a moving speed higher in the one portion of the glass layer than in the main portion of the glass layer. It will also be preferred if the glass layer is irradiated with the first laser light such that the main portion of the glass layer is irradiated with the first laser light so as to gasify the binder and melt the glass powder without irradiating the one portion of the glass layer with the first laser light, and the glass layer is irradiated with third laser light so as to gasify the binder in the one portion of the glass layer after irradiating the glass layer with the first laser light but before irradiating the glass layer with the second laser light.

These cases can reliably yield a state where the binder gasifies with the glass powder melting in the main portion of the glass layer, while the binder gasifies without melting the glass powder in the one portion of the glass layer.

Preferably, when the glass layer is irradiated with the second laser light while relatively moving the irradiation region of the second laser light along the region to be fused in the glass fusing method in accordance with the present invention, the glass layer is irradiated with the second laser light such that the second laser light has an irradiation power higher in the one portion of the glass layer than in the main portion of the glass layer. When irradiating the glass layer with the second laser light while relatively moving the irradiation region of the second laser light along the region to be fused, it is also preferred for the glass layer to be irradiated with the second laser light such that the second laser light has a moving speed lower in the one portion of the glass layer than in the main portion of the glass layer.

These can melt, when fusing the first and second glass members to each other by irradiation with the second laser light, the glass powder reliably in the one portion of the glass layer having a laser light absorptance lower than that in the main portion of the glass layer, thereby uniformly fusing the first and second glass members to each other throughout the glass layer.

Advantageous Effects of Invention

The present invention can manufacture a glass fusing structure which requires hermetic fusing.

DESCRIPTION OF EMBODIMENTS

Figure 1:
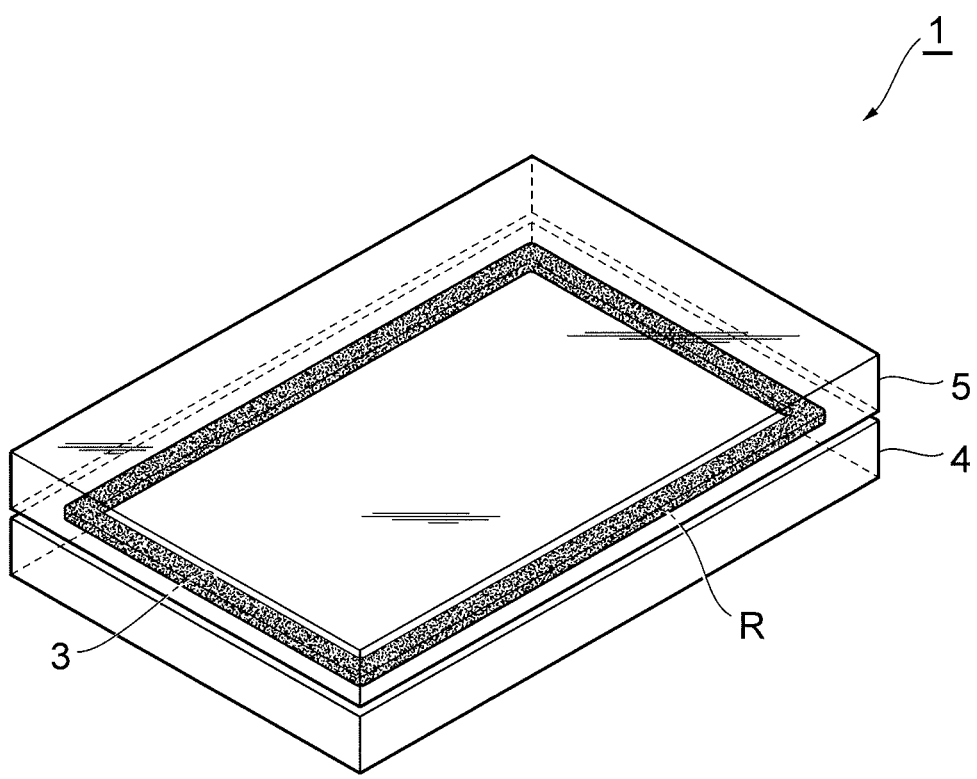
FIG. 1 is a perspective view of a glass fusing structure manufactured by an embodiment of the glass fusing method in accordance with the present invention.

In the following, preferred embodiments of the present invention will be explained in detail with reference to the drawings. In the drawings, the same or equivalent parts will be referred to with the same signs while omitting their overlapping descriptions.

As illustrated in FIG. 1, a glass fusing structure 1 is one in which a glass member (first glass member) 4 and a glass member (second glass member) 5 are fused to each other with a glass layer 3, which is formed along a region to be fused R, interposed therebetween. Each of the glass members 4, 5 is a rectangular sheet-shaped member having a thickness of 0.7 mm made of non-alkali glass, for example, while the region to be fused R is arranged like a rectangular ring with a predetermined width along the outer peripheries of the glass members 4, 5. The glass layer 3 is made of low-melting glass (vanadium-phosphate-based glass, lead-borate-based glass, or the like), for example, and formed into a rectangular ring with a predetermined width along the region to be fused R.

A glass fusing method (including a glass layer fixing method of producing a glass-layer-fixed member by fixing the glass layer 3 to the glass member 4 in order to manufacture the glass fusing structure 1 by fusing the glass members 4, 5 to each other) for manufacturing the glass fusing structure 1 will now be explained.

Figure 2:
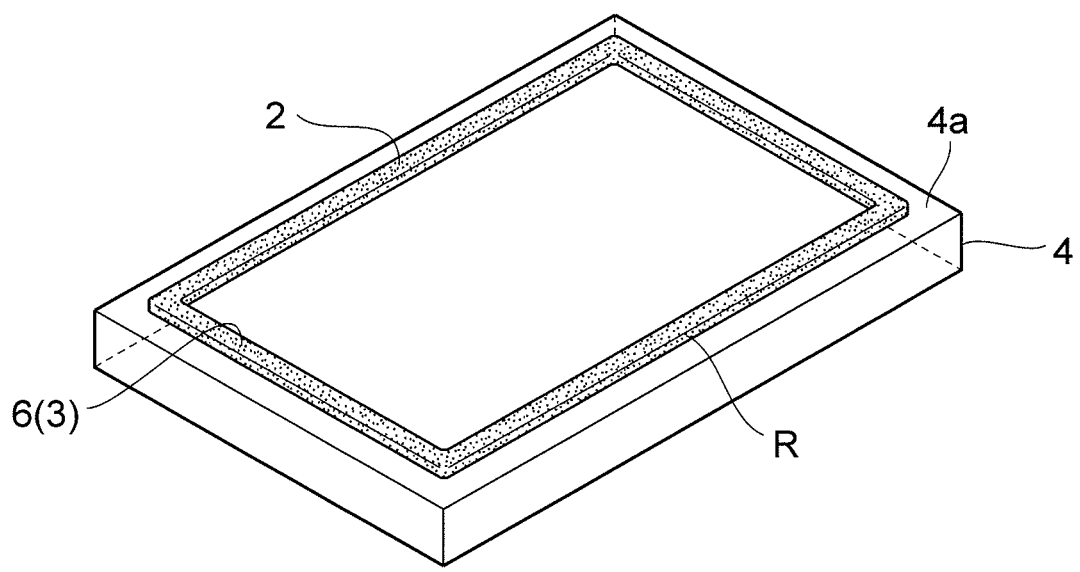
FIG. 2 is a perspective view for explaining the glass fusing method for manufacturing the glass fusing structure of FIG. 1.

First, as illustrated in FIG. 2, a frit paste is applied by a dispenser, screen printing, or the like, so as to form a paste layer 6 on a surface 4a of the glass member 4 along the region to be fused R. An example of the fit paste is one in which a powdery glass fit (glass powder) 2 made of low-melting glass (vanadium-phosphate-based glass, lead-borate-based glass, or the like), a laser-light-absorbing pigment (laser-light-absorbing material) which is an inorganic pigment such as iron oxide, an organic solvent such as amyl acetate, and a binder which is a resin component (acrylic or the like) thermally decomposable at the melting point temperature of the glass or lower are kneaded. That is, the paste layer 6 contains the organic solvent, binder, laser-light-absorbing pigment, and glass fit 2.

Subsequently, the paste layer 6 is dried, so as to remove the organic solvent. As a consequence, the glass layer 3 containing the binder, laser-light-absorbing pigment, and glass fit 2 is arranged on the glass member 4 along the ring-shaped region to be fused R extending like a closed rectangular ring. Scattering of light exceeding the absorption characteristic of the laser-light-absorbing pigment occurs because of the particle property of the glass frit 2 and the like in the glass layer 3 arranged on the surface 4a of the glass member 4, thereby placing it into a lower laser light absorptance state (e.g., the glass layer 3 looks whiter under visible light).

Figure 3:
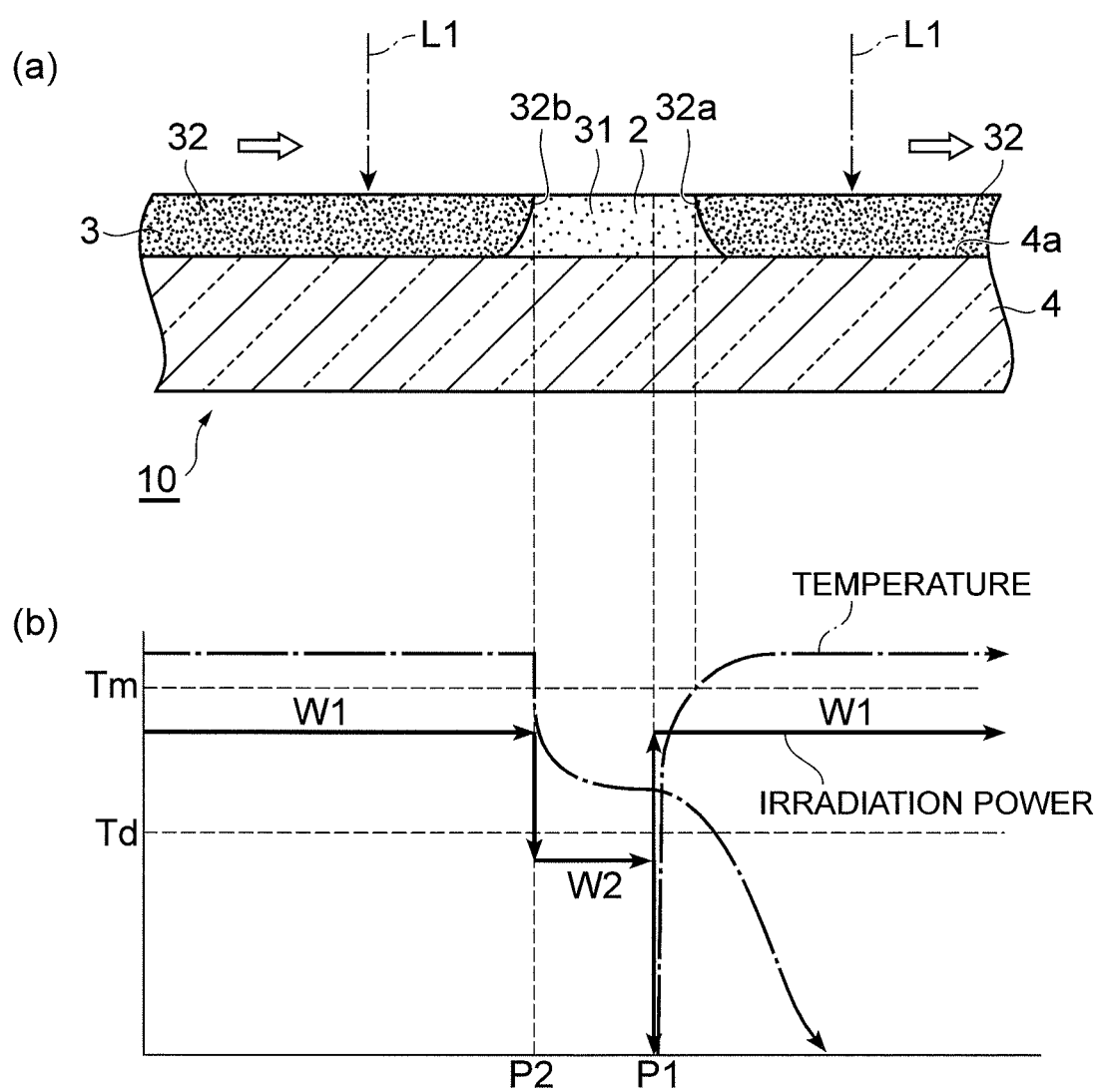
FIG. 3 is a sectional view for explaining the glass fusing method for manufacturing the glass fusing structure of FIG. 1.

Next, as illustrated in FIG. 3, the glass layer 3 is irradiated with laser light (first laser light) L1 while relatively moving an irradiation region of the laser light L1 along the region to be fused R with a position P1 on a linear part of the region to be fused R acting as start and end points, so as to melt a main portion 32 extending like a rectangular ring open at a one portion 31 in the glass layer 3, thereby fixing the main portion 32 of the glass layer 3 to the glass member 4 (temporary firing), thus yielding a glass-layer-fixed member 10. One end 32a and the other end 32b of the main portion 32 of the glass layer 3 oppose each other through the one portion 31 of the glass layer 3 in the linear part of the region to be fused R.

Here, the glass layer 3 contains the binder in addition to the laser-light-absorbing pigment and glass fit 2 and thus is irradiated with the laser light L1 such as to gasify the binder and melt the glass fit 2 in the main portion 32 of the glass layer 3, and gasify the binder without melting the glass frit 2 in the one portion 31 of the glass layer 3. Specifically, as illustrated in FIG. 3, the irradiation region of the laser light L1 is relatively moved with an irradiation power W1 from the position P1 along the region to be fused R. Subsequently, the irradiation power is switched from W1 to W2 (<W1) at a position P2, and the irradiation region of the laser light L1 is relatively moved with the irradiation power W2 to the position P1 along the region to be fused R. That is, the glass layer 3 is irradiated with the laser light L1 such that the irradiation power of the laser light L1 is lower in the one portion 31 of the glass layer 3 than in the main portion 32 of the glass layer 3 (i.e., such that the amount of heat input (the energy density owned by laser light in its irradiation region) is lower in the one portion 31 of the glass layer 3 than in the main portion 32 of the glass layer 3). The moving speed of the laser light L1 (the relative moving speed of the irradiation region of the laser light with respect to the region to be fused) is constant.

In this case, the temperature of the glass layer 3 reaches its melting point Tm immediately after the position P1 (the position corresponding to one end 32a of the main portion 32 of the glass layer 3), then is kept at the melting point Tm or higher, becomes the melting point Tm or lower at the position P2 (the position corresponding to the other end 32b of the main portion 32 of the glass layer 3), and drops thereafter. However, the temperature of the glass layer 3 is held at the decomposition point Td of the binder or higher in a part (corresponding to the one portion 31 of the glass layer 3) between the position P2 and a position immediately after the position P1.

As a consequence, in the main portion 32 of the glass layer 3, the binder is gasified and removed, while the glass frit 2 melts, so as to burn and fix the glass layer 3 onto the front face 4a of the glass member 4. In the one portion 31 of the glass layer 3, on the other hand, the glass frit 2 remains without melting, while the binder is gasified and removed. In the main portion 32 of the glass layer 3, the glass frit 2 melts, so as to lose its particle property and so forth, whereby the absorption characteristic of the laser-light-absorbing pigment appears remarkably, which makes the laser light absorptance higher in the main portion 32 of the glass layer 3 than in the one portion 31 of the glass layer 3 (e.g., under visible light, the main and one portions 32, 31 of the glass layer 3 look darker or greener and whiter, respectively).

Figure 4:
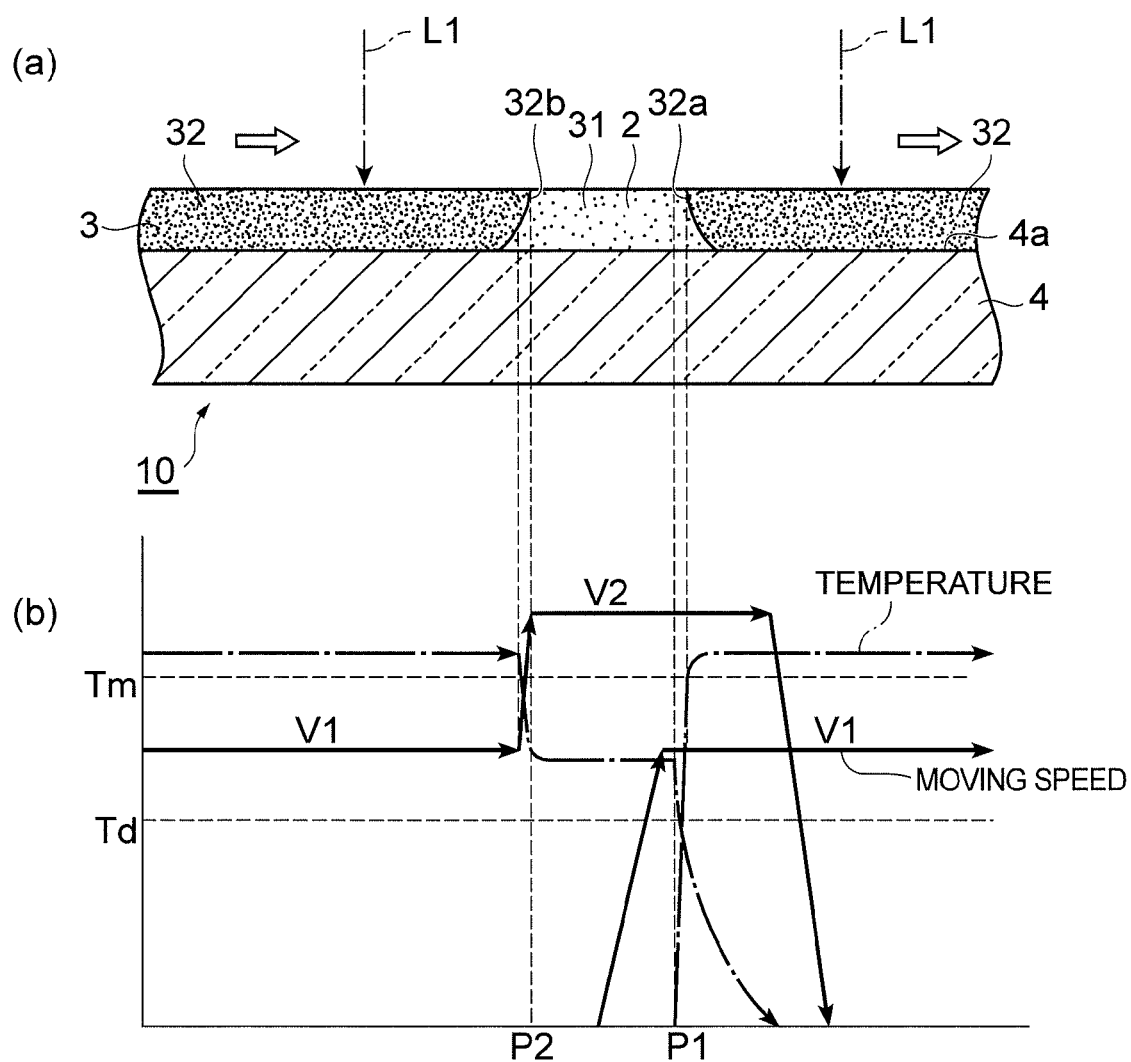
FIG. 4 is a sectional view for explaining the glass fusing method for manufacturing the glass fusing structure of FIG. 1.

When yielding the glass-layer-fixed member 10 by the temporary firing, the moving speed of the laser light L1 may be switched as follows, while keeping the irradiation power of the laser light L1 constant. That is, as illustrated in FIG. 4, the moving speed of the laser light L1 is caused to reach V1 immediately before the position P1, and the irradiation region of the laser light L1 is relatively moved at the moving speed V1 from the position P1 along the region to be fused R. Then, the moving speed is caused to reach V2 (>V1) immediately before the position P2, and the irradiation region of the laser light L1 is relatively moved at the moving speed V2 along the region to be fused R until it passes the position P1. That is, the glass layer 3 is irradiated with the laser light L1 such that the moving speed of the laser light L1 is higher in the one portion 31 of the glass layer 3 than in the main portion 32 of the glass layer 3 (i.e., such that the amount of heat input is lower in the one portion 31 of the glass layer 3 than in the main portion 32 of the glass layer 3).

In this case, the temperature of the glass layer 3 reaches its melting point Tm immediately after the position P1 (the position corresponding to one end 32a of the main portion 32 of the glass layer 3), then is kept at the melting point Tm or higher, becomes the melting point Tm or lower at the position P2 (the position corresponding to the other end 32b of the main portion 32 of the glass layer 3), and drops thereafter. However, the temperature of the glass layer 3 is held at the decomposition point Td of the binder or higher in a part (corresponding to the one portion 31 of the glass layer 3) between the position P2 and a position immediately after the position P1.

As a consequence, in the main portion 32 of the glass layer 3, the binder is gasified and removed, while the glass frit 2 melts, so as to burn and fix the glass layer 3 onto the front face 4a of the glass member 4. In the one portion 31 of the glass layer 3, on the other hand, the glass frit 2 remains without melting, while the binder is gasified and removed.

Figure 5:
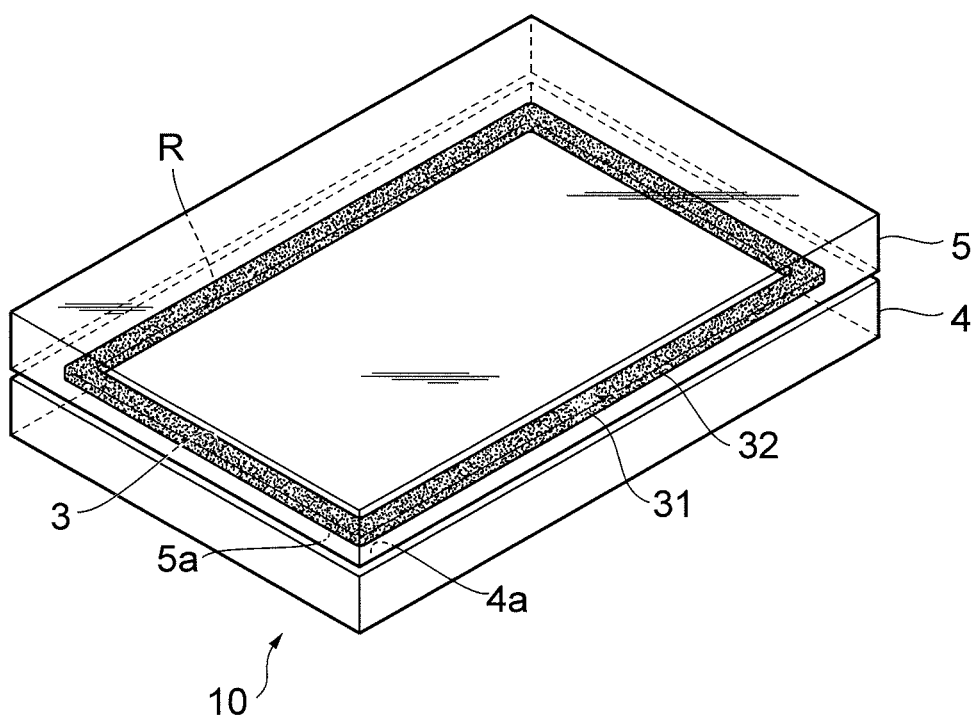
FIG. 5 is a perspective view for explaining the glass fusing method for manufacturing the glass fusing structure of FIG. 1.
Figure 6:
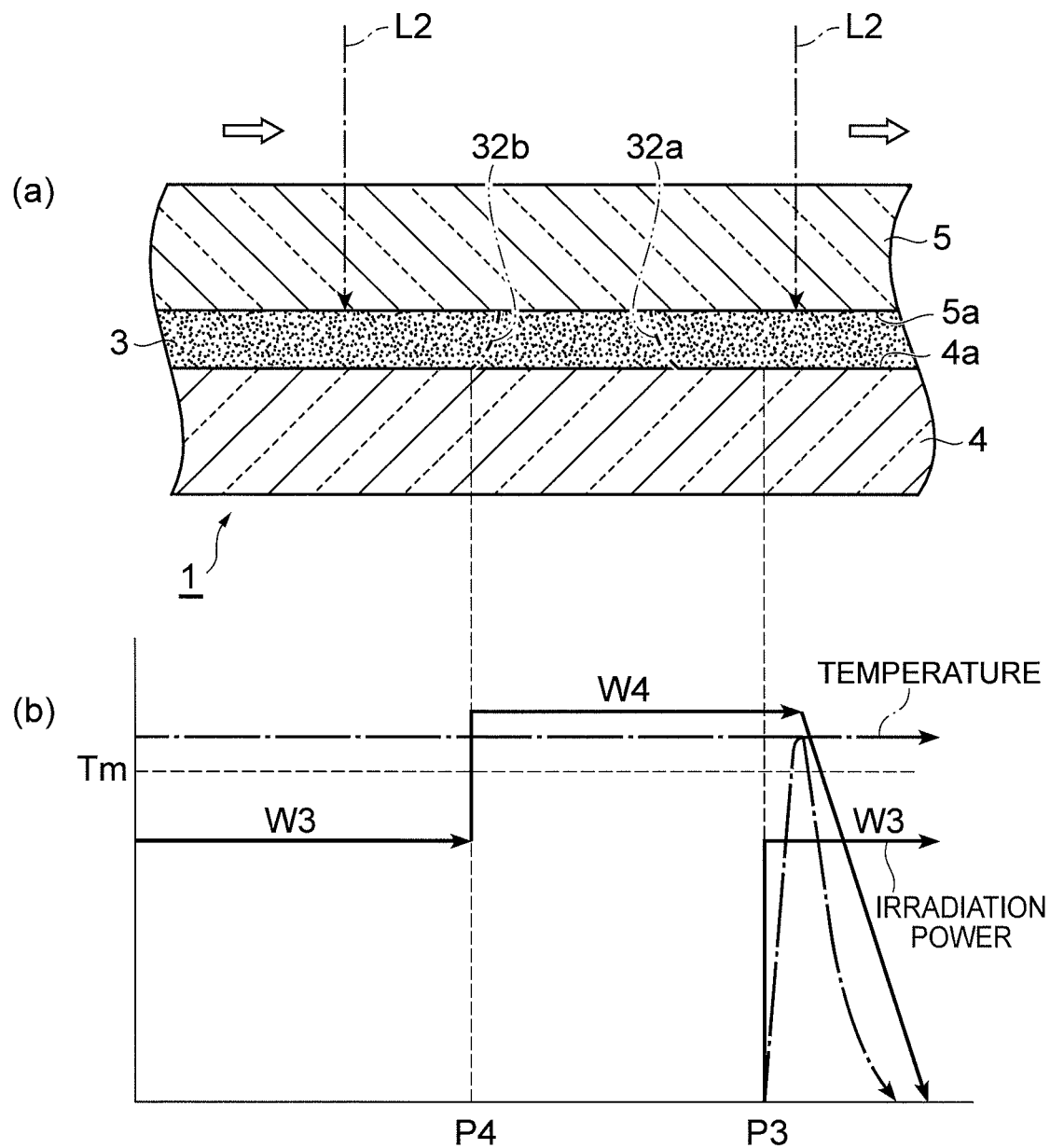
FIG. 6 is a sectional view for explaining the glass fusing method for manufacturing the glass fusing structure of FIG. 1.

Subsequently, as illustrated in FIG. 5, the glass member 5 is superposed on the glass-layer-fixed member 10 (i.e., the glass member 4 having the main portion 32 of the glass layer 3 fixed thereto) with the glass layer 3 interposed therebetween. Then, as illustrated in FIG. 6, the glass layer 3 is irradiated with laser light (second laser light) L2 along the region to be fused R. That is, the glass layer 3 is irradiated with the laser light L2, while relatively moving an irradiation region of the laser light L2 along the region to be fused R. This lets the glass layer 3 and its peripheral parts (the parts of surfaces 4a, 5a of the glass members 4, 5) melt and re-solidify, thereby bonding the glass members 4, 5 to each other (final firing), thus yielding the glass fusing structure 1 (there is also a case where not the glass members 4, 5 but the glass layer 3 melts in fusing).

Specifically, as illustrated in FIG. 6, the irradiation region of the laser light L2 is relatively moved with an irradiation power W3 from a position P3 immediately after a position corresponding to one end 32a of the main portion 32 of the glass layer 3 along the region to be fused R. Then, the irradiation power is switched from W3 to W4 (>W3) at a position P4 immediately before a position corresponding to the other end 32b of the main portion 32 of the glass layer 3, and the irradiation region of the laser light L2 is relatively moved with the irradiation power W4 along the region to be fused R until it passes the position P3. That is, the glass layer 3 is irradiated with the laser light L2 such that the irradiation power of the laser light L2 is higher in the one portion 31 of the glass layer 3 than in the main portion 32 of the glass layer 3 (i.e., such that the amount of heat input is higher in the one portion 31 of the glass layer 3 than in the main portion 32 of the glass layer 3). The moving speed of the laser light L2 is constant.

In this case, the temperature of the glass layer 3 reaches its melting point Tm immediately after the position P3, is reliably kept constant at the melting point Tm or higher for one round of the rectangular ring-shaped region R, and drops thereafter. Thus, even when the irradiation power of the laser light L2 is switched, the temperature in the one and main portions 31, 32 of the glass layer 3 is kept constant at the melting point Tm or higher, since the laser light absorptance of the glass layer 3 is lower in the one portion 31 than in the main portion 32. In view of this, irradiation with the laser light L2 at the irradiation power W3 should be started from the main portion 32 of the glass layer 3.

This melts the glass layer 3 as a whole without heating it in excess, thereby uniformly fusing the glass members 4, 5 to each other. Since the excess heating by irradiation with the laser light L2 is thus suppressed, damages in the glass fusing structure 1, such as cracks caused by heat shocks in the glass members 4, 5, are prevented from occurring.

Figure 7:
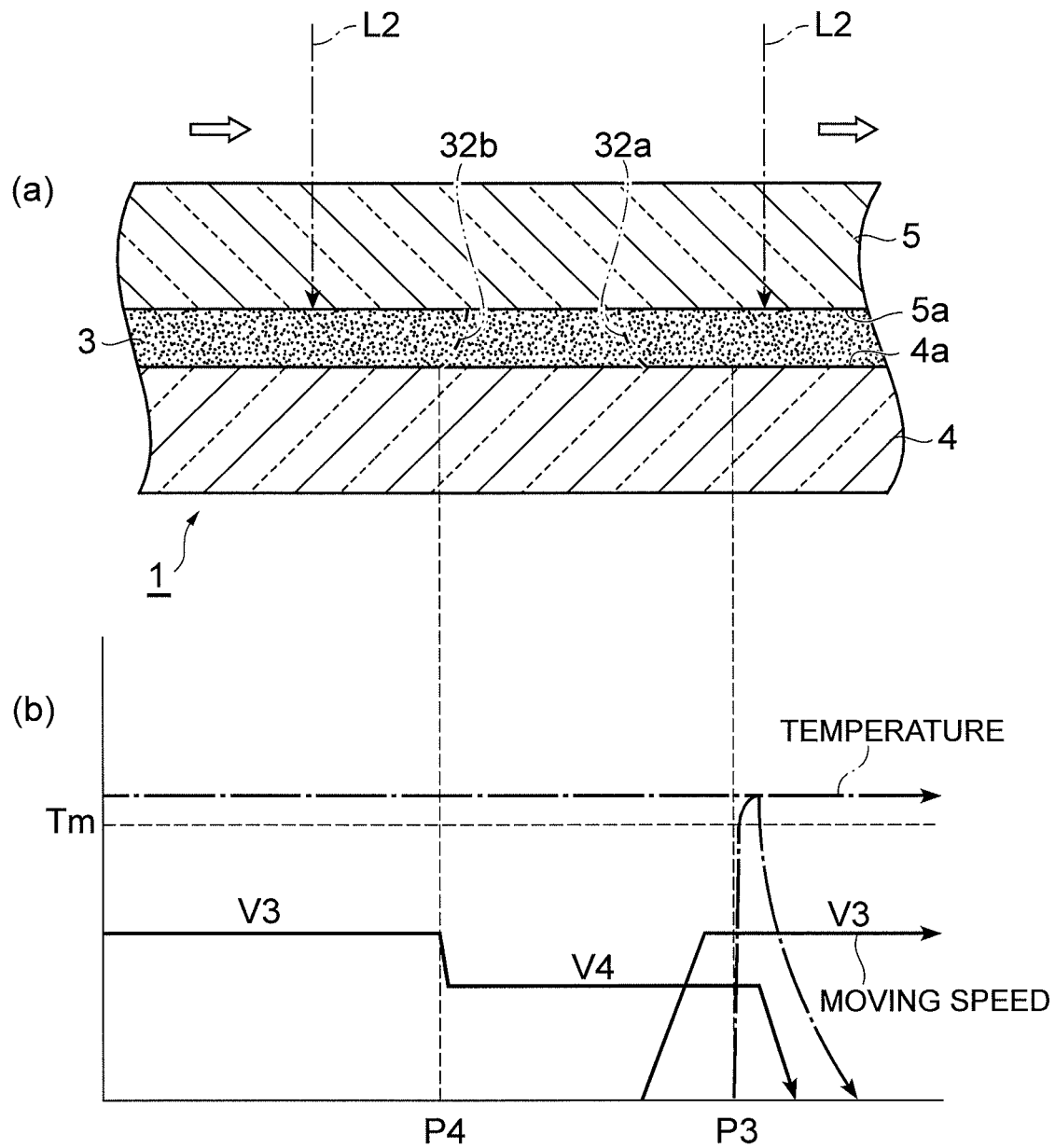
FIG. 7 is a sectional view for explaining the glass fusing method for manufacturing the glass fusing structure of FIG. 1.
Figure 8:
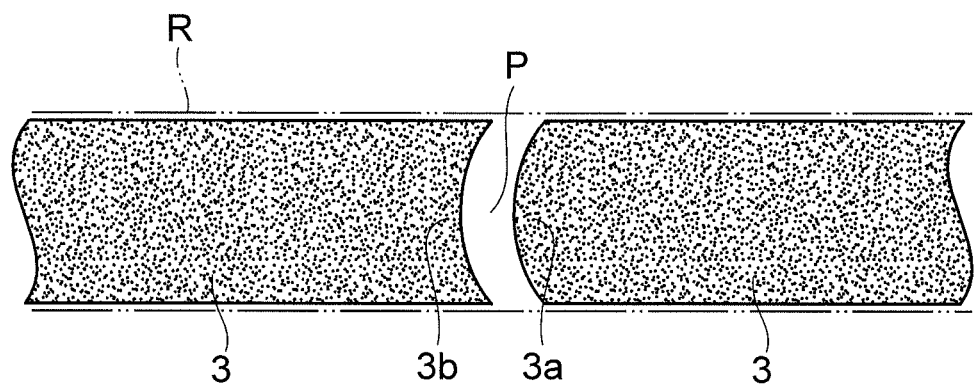
FIG. 8 is a plan view of melt starting and termination end parts of a glass layer fixed to a glass member.
Figure 9:
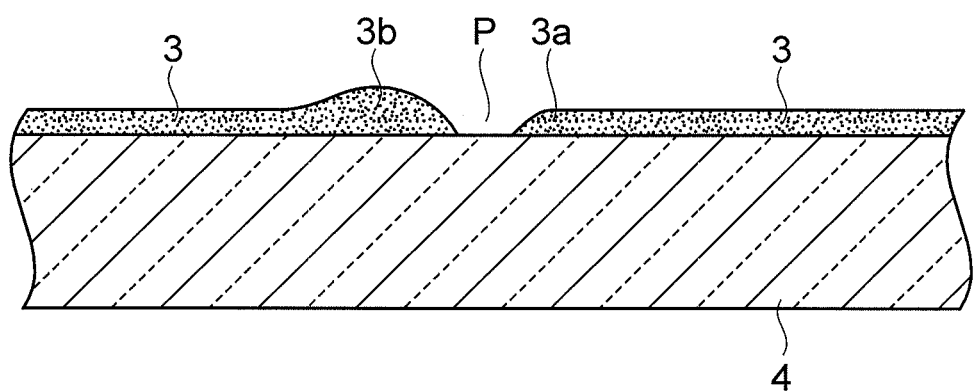
FIG. 9 is a sectional view of the melt starting and termination end parts of the glass layer fixed to the glass member.
Figure 10:
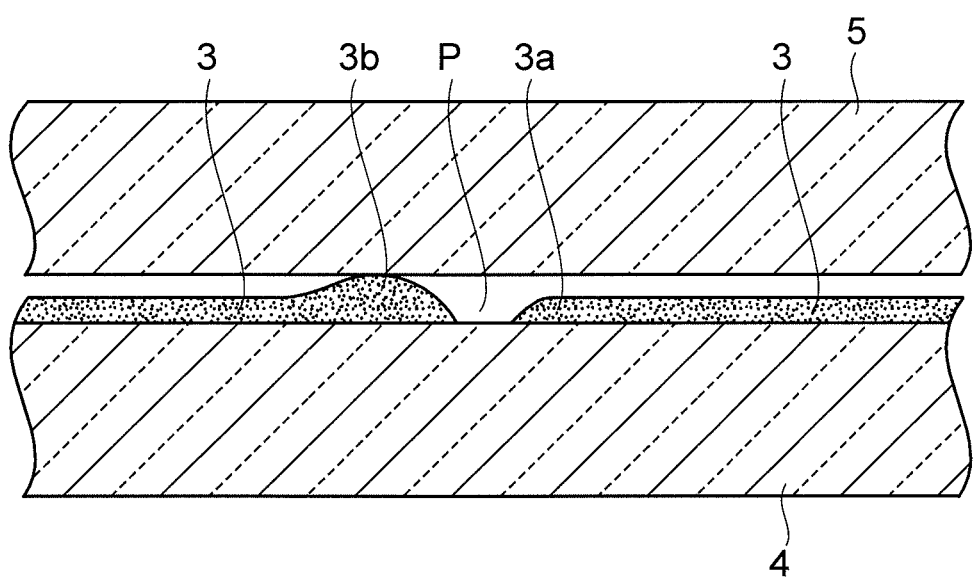
FIG. 10 is a sectional view of the melt starting and termination end parts of the glass layer fixed to the glass member.
Figure 11:
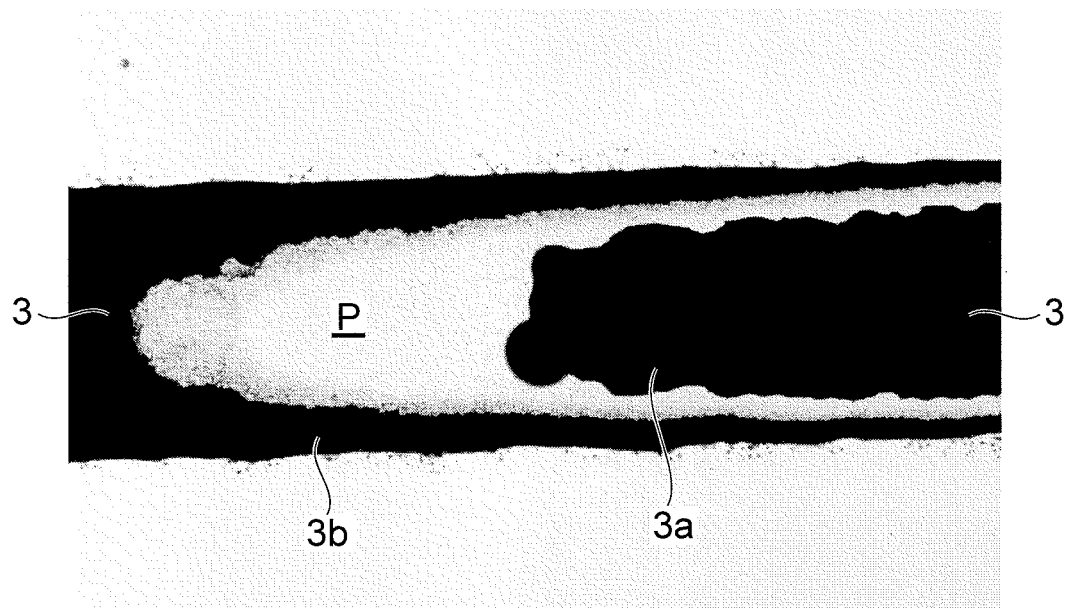
FIG. 11 is a picture representing a photograph of the melt starting and termination end parts of the glass layer fixed to the glass member.
Figure 12:
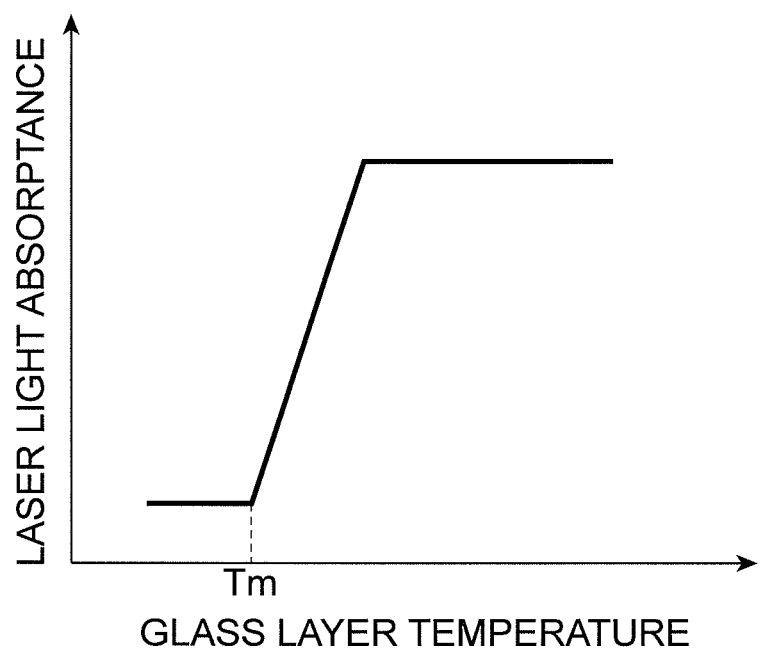
FIG. 12 is a graph illustrating the relationship between the temperature and laser light absorptance of the glass layer.
Figure 13:
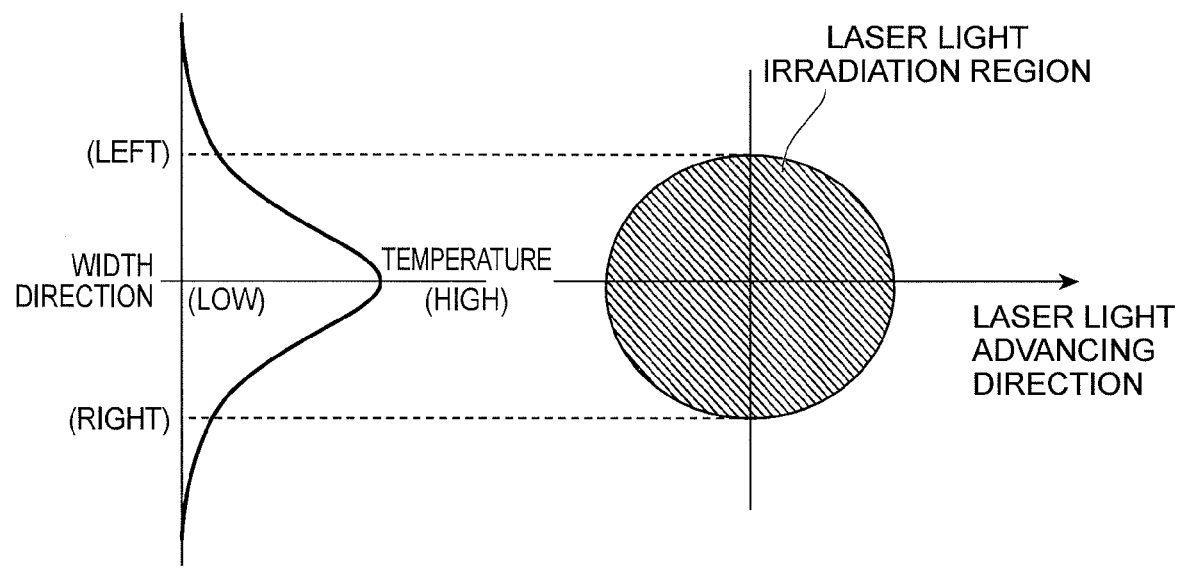
FIG. 13 is a chart illustrating a temperature distribution in laser irradiation.
Figure 14:
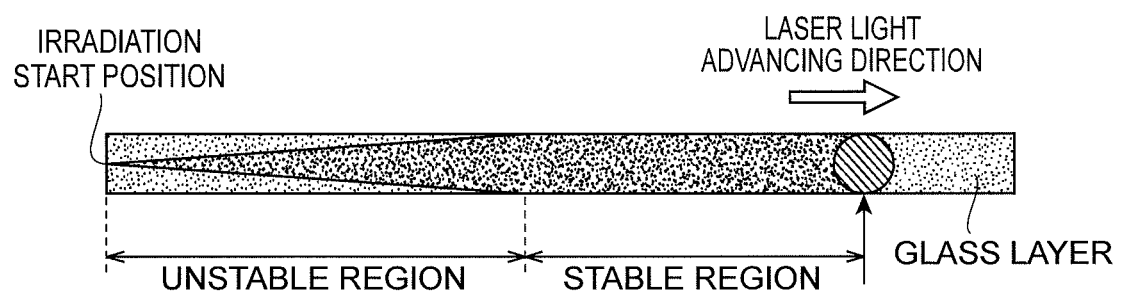
FIG. 14 is a diagram illustrating stable and unstable regions in laser irradiation.

When yielding the glass fusing structure 1 by the final firing, the moving speed of the laser light L2 may be switched as follows, while keeping the irradiation power of the laser light L2 constant. That is, as illustrated in FIG. 7, the moving speed of the laser light L2 is caused to reach V3 immediately before the position P3 just after a position corresponding to one end 32a of the main portion 32 of the glass layer 3, and the irradiation region of the laser light L2 is relatively moved at the moving speed V3 from the position P3 along the region to be fused R. Then, the moving speed is caused to reach V4 (<V3) immediately after the position P4 corresponding to the other end 32b of the main portion 32 of the glass layer 3, and the irradiation region of the laser light L2 is relatively moved at the moving speed V4 along the region to be fused R until it passes the position P3. That is, the glass layer 3 is irradiated with the laser light L2 such that the moving speed of the laser light L2 is lower in the one portion 31 of the glass layer 3 than in the main portion 32 of the glass layer 3 (i.e., such that the amount of heat input is higher in the one portion 31 of the glass layer 3 than in the main portion 32 of the glass layer 3).

In this case, the temperature of the glass layer 3 reaches its melting point Tm immediately after the position P3, is reliably kept constant at the melting point Tm or higher for one round of the rectangular ring-shaped region R, and drops thereafter. Thus, even when the moving speed of the laser light L2 is switched, the temperature in the one and main portions 31, 32 of the glass layer 3 is kept constant at the melting point Tm or higher, since the laser light absorptance of the glass layer 3 is lower in the one portion 31 than in the main portion 32. In view of this, irradiation with the laser light L2 at the moving speed V3 should be started from the main portion 32 of the glass layer 3.

This melts the glass layer 3 as a whole without heating it in excess, thereby uniformly fusing the glass members 4, 5 to each other. Since the excess heating by irradiation with the laser light L2 is thus suppressed, damages in the glass fusing structure 1, such as cracks caused by heat shocks in the glass members 4, 5, are prevented from occurring.

As explained in the foregoing, the glass fusing method for manufacturing the glass fusing structure 1 (including the glass layer fixing method) irradiates the glass layer 3 with the laser light L1 for temporary firing, so as to melt the main portion 32 of the glass layer 3 excluding the one portion 31 thereof and extending like a ring open at the one portion 31, thereby fixing it to the glass member 4. As a consequence, the one portion 31 of the glass layer 3 in which the glass fit 2 is not molten exists between one end 32a and the other end 32b of the glass layer 3 fixed to the glass member 4. Superposing the glass member 5 on the glass member 4 with the glass layer 3 interposed therebetween in this state and irradiating the one portion 31 and main portion 32 of the glass layer 3 with the laser light L2 for final firing, so as to fuse the glass members 4, 5 to each other, can prevent leaks from occurring in the glass layer 3, thereby making it possible to manufacture the glass fusing structure 1 requiring hermetic fusing.

One end 32a and the other end 32b of the main portion 32 of the glass layer 3 are formed such as to oppose each other in a linear part of the region to be fused R through the one portion 31 of the glass layer 3. This allows the one portion 31 of the glass layer 3 to exist accurately by a predetermined width between one end 32a and the other end 32b of the main portion 32 of the glass layer 3.

The glass layer 3 is irradiated with the laser light L1 for temporary firing such as to gasify the binder and melt the glass fit 2 in the main portion 32 of the glass layer 3 and gasify the binder without melting the glass frit 2 in the one portion 31 of the glass layer 3. This can reliably prevent bubbles from being formed in the one portion 31 of the glass layer 3 by gasification of the binder and leaks from occurring in the one portion 31 of the glass layer 3 by a number of bubbles connecting with each other when fusing the glass members 4, 5 to each other by irradiation with the laser light L2 for final firing.

Here, the glass layer 3 is irradiated with the laser light L1 for temporary firing such that its irradiation power is lower in the one portion 31 of the glass layer 3 than in the main portion 32 of the glass layer 3. Alternatively, the glass layer 3 is irradiated with the laser light L1 for temporary firing such that its moving speed is higher in the one portion 31 of the glass layer 3 than in the main portion 32 of the glass layer 3. These can reliably yield a state where the binder gasifies with the glass fit 2 melting in the main portion 32 of the glass layer 3, while the binder gasifies without melting the glass fit 2 in the one portion 31 of the glass layer 3.

The glass layer 3 is irradiated with the laser light L2 for final firing such that the its irradiation power is higher in the one portion 31 of the glass layer 3 than in the main portion 32 of the glass layer 3. Alternatively, the glass layer 3 is irradiated with the laser light L2 for final firing such that its moving speed is lower in the one portion 31 of the glass layer 3 than in the main portion 32 of the glass layer 3. These can melt, when fusing the glass members 4, 5 to each other by irradiation with the laser light L2 for final firing, the glass frit 2 reliably in the one portion 31 of the glass layer 3 having a laser light absorptance lower than that in the main portion 32 of the glass layer 3, thereby uniformly fusing the glass members 4, 5 to each other throughout the glass layer 3.

The present invention is not limited to the above-mentioned embodiment. For example, the glass-layer-fixed member 10 may be obtained by temporary firing in the following manner. That is, the glass layer 3 is irradiated with the laser light L1 for temporary firing such that the main portion 32 but not the one portion 31 of the glass layer 3 is irradiated with the laser light L1. Then, the glass layer 3 is irradiated with laser light (third laser light) so as to gasify the binder in the one portion 31 of the glass layer 3 after irradiating the glass layer 3 with the laser light L1 for temporary firing but before irradiating the glass layer 3 with the laser light L2 for final firing. This can also reliably yield a state where the binder gasifies with the glass frit 2 melting in the main portion 32 of the glass layer 3, while the binder gasifies without melting the glass frit 2 in the one portion 31 of the glass layer 3.

When it is necessary for the glass-layer-fixed member 10 to be transported over a long distance or time and so forth, the one portion 31 of the glass layer 3 can be prevented from breaking if the binder is not removed therefrom at the time of temporary firing.

Irradiation with the laser light L2 for final firing may be performed at once for the whole glass layer 3 without being restricted to the one relatively moving its irradiation region along the region to be fused R. The glass layer 3 to be irradiated with the laser light L1 for temporary firing may be one corresponding to the paste layer 6 containing the organic solvent, binder, laser-light-absorbing pigment, and glass fit 2, or one containing the organic solvent and glass fit 2 by removing the organic solvent and binder from the paste layer 6 and so forth. The glass fit 2 may have a melting point on a par with or higher than that of the glass members 4, 5 instead of that lower than the latter.

The laser-light-absorbing pigment may be contained in the glass fit 2 itself. The region to be fused R is not limited to the rectangular ring shape, but may be formed into a circular ring or the like as long as it extends like a closed ring.

INDUSTRIAL APPLICABILITY

The present invention can manufacture a glass fusing structure which requires hermetic fusing.

REFERENCE SIGNS LIST

1 . . . glass fusing structure; 2 . . . glass fit (glass powder); 3 . . . glass layer; 4 . . . glass member (first glass member); 5 . . . glass member (second glass member); 10 . . . glass-layer-fixed member; 31 . . . one portion; 32 . . . main portion; 32a . . . one end; 32b . . . other end; 32a . . . one end; 32b . . . other end; L1 . . . laser light (first laser light); L2 . . . laser light (second laser light); R . . . region to be fused

The invention claimed is:

1. A glass fusing method for manufacturing a glass fusing structure by fusing first and second glass members to each other, the method comprising the steps of:
   arranging a glass layer containing a laser-light-absorbing material and a glass powder on the first glass member along a region to be fused extending like a closed ring;
   irradiating the glass layer with first laser light while relatively moving an irradiation region of the first laser light along the region to be fused, so as to melt a main portion of the glass layer extending like a ring open at a one portion of the glass layer, thereby fixing the main portion of the glass layer to the first glass member; and
   superposing the second glass member on the first glass member having the main portion of the glass layer fixed thereto with the glass layer interposed therebetween and irradiating the glass layer with second laser light, so as to fuse the first and second glass members to each other.

2. A glass fusing method according to claim 1, wherein the region to be fused has a linear part; and
   wherein one and the other ends of the main portion of the glass layer oppose each other in the linear part through the one portion of the glass layer.

3. A glass fusing method according to claim 1, wherein the glass layer further contains a binder and is irradiated with the first laser light such as to gasify the binder and melt the glass powder in the main portion of the glass layer and gasify the binder without melting the glass powder in the one portion of the glass layer.

4. A glass fusing method according to claim 3, wherein the glass layer is irradiated with the first laser light such that the first laser light has an irradiation power lower in the one portion of the glass layer than in the main portion of the glass layer.

5. A glass fusing method according to claim 3, wherein the glass layer is irradiated with the first laser light such that the first laser light has a moving speed higher in the one portion of the glass layer than in the main portion of the glass layer.

6. A glass fusing method according to claim 1, wherein the glass layer further contains a binder;
   wherein the glass layer is irradiated with the first laser light such that the main portion of the glass layer is irradiated with the first laser light so as to gasify the binder and melt the glass powder without irradiating the one portion of the glass layer with the first laser light; and
   wherein the glass layer is irradiated with third laser light so as to gasify the binder in the one portion of the glass layer after irradiating the glass layer with the first laser light but before irradiating the glass layer with the second laser light.

7. A glass fusing method according to claim 1, wherein the glass layer is irradiated with the second laser light while relatively moving the irradiation region of the second laser light along the region to be fused such that the second laser light has an irradiation power higher in the one portion of the glass layer than in the main portion of the glass layer.

8. A glass fusing method according to claim 1, wherein the glass layer is irradiated with the second laser light while relatively moving the irradiation region of the second laser light along the region to be fused such that the second laser light has a moving speed lower in the one portion of the glass layer than in the main portion of the glass layer.

9. A glass layer fixing method for manufacturing a glass-layer-fixed member by fixing a glass layer to a first glass member, the method comprising the steps of:
   arranging the glass layer containing a laser-light-absorbing material and a glass powder on the first glass member along a region to be fused extending like a closed ring; and
   irradiating the glass layer with first laser light while relatively moving an irradiation region of the first laser light along the region to be fused, so as to melt a main portion of the glass layer extending like a ring open at a one portion of the glass layer, thereby fixing the main portion of the glass layer to the first glass member.

* * * * *